United States Patent
Hess et al.

(10) Patent No.: US 12,047,370 B2
(45) Date of Patent: *Jul. 23, 2024

(54) DATA ENCRYPTION USING PUBLIC KEY CRYPTOGRAPHY AND CERTIFICATE VERIFICATION

(71) Applicant: Snowflake Inc., Bozeman, MT (US)

(72) Inventors: Alexander Hess, Toronto (CA); Joshua Vittum Makinen, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,455

(22) Filed: Apr. 12, 2023

(65) Prior Publication Data

US 2024/0146716 A1 May 2, 2024

Related U.S. Application Data

(63) Continuation of application No. 17/976,692, filed on Oct. 28, 2022, now Pat. No. 11,647,013.

(51) Int. Cl.
*H04L 9/40* (2022.01)
*H04L 9/08* (2006.01)

(52) U.S. Cl.
CPC ........ *H04L 63/0823* (2013.01); *H04L 9/0825* (2013.01); *H04L 9/085* (2013.01)

(58) Field of Classification Search
CPC .... H04L 63/0823; H04L 9/0825; H04L 9/085
See application file for complete search history.

(56) References Cited

U.S. PATENT DOCUMENTS

| | | |
|---|---|---|
| 2004/0255037 A1 | 12/2004 | Corvari et al. |
| 2010/0023757 A1* | 1/2010 | Nguyen-Huu ........ H04L 9/3263 380/282 |
| 2017/0163618 A1* | 6/2017 | Peddada ............... H04L 9/3236 |
| 2017/0244753 A1 | 8/2017 | Hu |
| 2022/0376929 A1* | 11/2022 | Nagaratnam ......... H04L 9/3234 |

* cited by examiner

*Primary Examiner* — Henry Tsang
(74) *Attorney, Agent, or Firm* — WOMBLE BOND DICKINSON (US) LLP

(57) ABSTRACT

A system and method of encrypting data using public key cryptography and certificate verification. The method includes receiving a request for a digital certificate. The method includes signing, by a processing device, the request using a second private key to generate a signed request. The method includes generating the digital certificate based on the signed request and a different private key. The method includes causing the digital certificate to be stored in a shared data storage available to a first client device. The method includes signing an encrypted secret using a first private key associated with the first client device to generate a signed encrypted secret, wherein the first private key is inaccessible to the first client device.

30 Claims, 7 Drawing Sheets

600

receiving an unsigned digital certificate signing request (CSR) for a second digital certificate associated with a second application executing on a second client device
602

↓ signing, by a processing device of a secret sharing management system, the unsigned CSR using a second private key associated with the second client device to generate a signed CSR
604

↓ generating a second digital certificate associated with the second application based on the signed CSR and a different private key associated with the KMS system
606

↓ causing the second digital certificate associated with the second application to be stored in a shared data storage available to a first client device
608

FIG. 6

DATA ENCRYPTION USING PUBLIC KEY CRYPTOGRAPHY AND CERTIFICATE VERIFICATION

RELATED APPLICATIONS

This application is a continuation of U.S. patent application Ser. No. 17/976,692, filed on Oct. 28, 2022, which is herein incorporated by reference in its entirety.

TECHNICAL FIELD

The present disclosure relates generally to cryptography, and more particularly, to systems and methods of encrypting data via public key cryptography with certificate verification of target.

BACKGROUND

Code-Signing is the process of digitally signing applications, executables, and/or scripts to confirm the software author and guarantee that the code has not been altered or corrupted since it was signed. Software or computer code is digitally signed using an asymmetric private key and the code signature is verified using the corresponding asymmetric public key encapsulated within a digital certificate (also referred to as "code-sign certificate", "a public key certificate" or "an identity certificate"), which is an electronic document used to prove the ownership of a public key.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 is a flow diagram depicting a method of encrypting data via public key cryptography with certificate verification of target, according to some embodiments.

DETAILED DESCRIPTION

Figure 1:
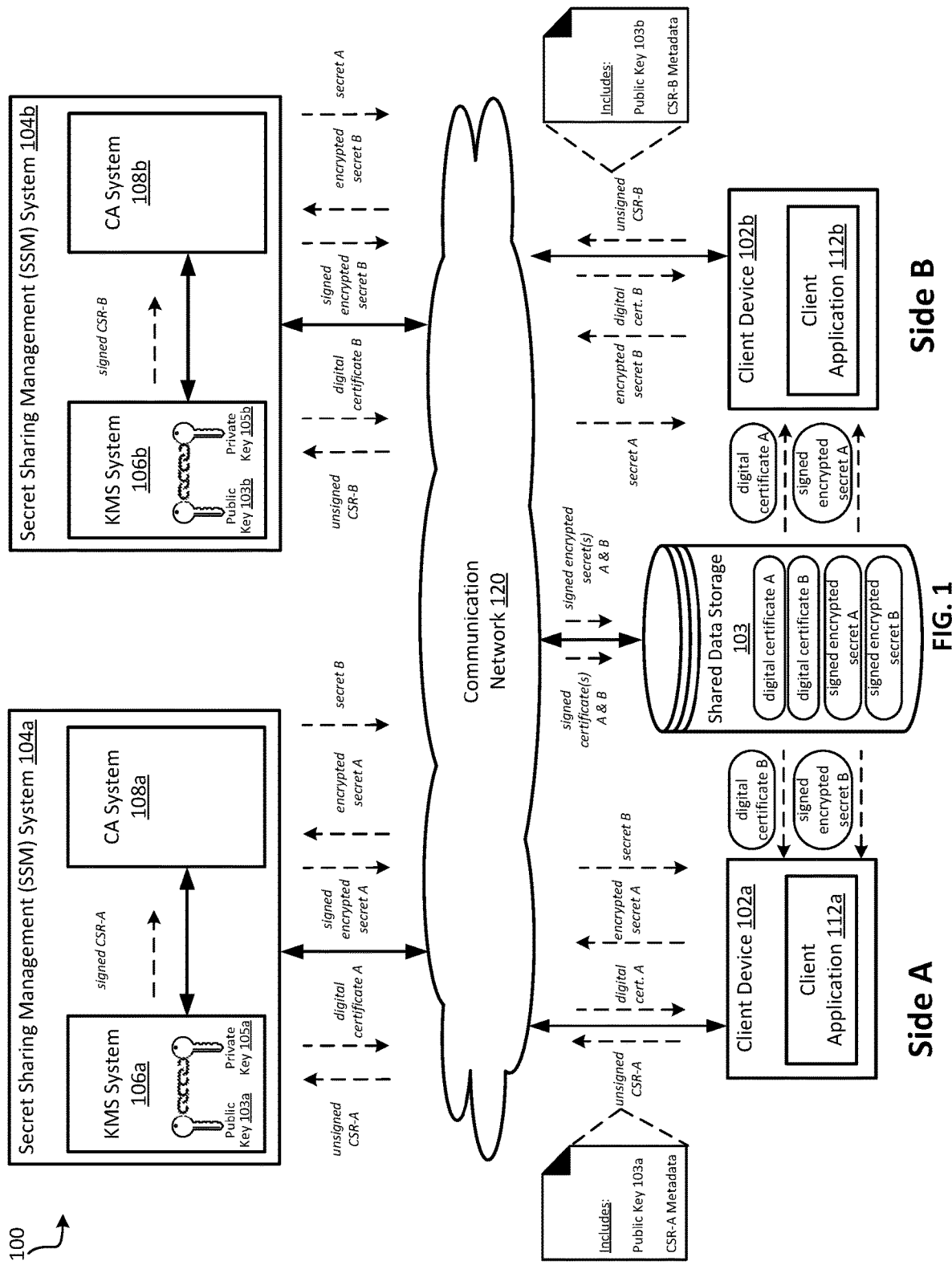
FIG. 1 is a block diagram depicting an example environment for encrypting data via public key cryptography with certificate verification of target, according to some embodiments.

Computing devices might want to transfer a secret (e.g., confidential information) between one another. To do so, the conventional system connects each of the computing devices to the same secret storage system (e.g., a cloud server) through a network (e.g., Wi-Fi, cellular, Bluetooth, etc.). When the first computing device wants to share a secret with the second computing device, it would simply transfer the secret to the secret storage system and the second computing device would retrieve the secret from the secret storage system. However, using the secret storage system as a central location for storing the secrets of the computing devices on a network creates significant security vulnerabilities for the computing devices, as well as the network. For example, if just one bad actor breached the security of the secret storage system, then all the secrets (e.g., passwords, tokens) of the computing devices would be exposed to the bad actor. By using the information in the exposed secret, the bad actor could have an unapproved and unregulated privilege to exploit the resources (e.g., memory resources, power resources, processing resources, networking resources, etc.) of the computing device and the network. The bad actor could then excessively use these resources in a malicious manner, such to waste the computing resources and/or cause increased network congestion by, for example, sending numerous spam messages across the network.

Alternatively, public/private key cryptography may be used to transfer the secret between computing devices. Here, the first computing device would retrieve the public key of the second computing device, encrypt the secret, and then send the encrypted secret to the second computing device. The second computing device would then decrypt the encrypted secret to reveal the secret. However, this solution also suffers from its own problems. First, there is no mechanism for the first computing device to verify the authenticity of the key to confirm that the key belongs to the second computing device. As such, any bad actor could just pretend to be the second computing device and send the first computing device their own key.

Second, there is also no mechanism for the second computing device to know that the secret came from the first computing device. For example, any computing device could use the public key of the second computing device to send an encrypted secret to the second computing device. Without verifying the source of the secret, the receiving computing device could receive a secret that includes malicious instructions that, when executed by the receiving computing device, cause the receiving computing device to grant an unregulated privilege to the bad actor to exploit the resources of the computing device and network. Thus, there is a long-felt but unsolved need to solve the problems of securely sharing secrets between computing devices in a network.

Aspects of the present disclosure address the above-noted and other deficiencies by using a secret sharing management (SSM) system to control access to the private keys used for sharing secrets between computing devices; thereby allowing for decentralized secrets transfer without the concern of private keys being lost or kept in the memory of the computing devices.

As discussed in greater detail below, a secret sharing management (SSM) system receives an unsigned digital certificate signing request (CSR) for a second digital certificate associated with a second application executing on a second client device (e.g., a computing device). In some embodiments, an unsigned CSR is a CSR that is not signed using a key (e.g., public key or private key). Upon receiving the unsigned CSR, the SSM system signs the unsigned CSR using a second private key associated with the second client device to generate a signed CSR. The second private key is inaccessible to the second client device. The SSM system generates a second digital certificate associated with the second application based on the signed CSR and a different private key associated with the SSM system. The SSM system causes the second digital certificate associated with the second application to be stored in a shared data storage available to a first client device by directly saving the second digital certificate into the shared data storage, or by sending the second digital certificate to the second client device, which in turn, saves the second digital certificate into the shared data storage itself.

The SSM system receives, from the first client device, a first request to sign an encrypted secret that was generated based on a second public key associated with the second digital certificate. The SSM system signs the encrypted secret using a first private key associated with the first client device to generate a signed encrypted secret and causes the signed encrypted secret to be stored in the shared data storage. The SSM system receives, from the second client device, a second request to decrypt the signed encrypted secret. The SSM system decrypts the signed encrypted secret using the second private key associated with the second client device to expose a secret.

FIG. 1 is a block diagram depicting an example environment for encrypting data via public key cryptography with certificate verification of target, according to some embodiments. The environment 100 includes secret sharing management (SSM) systems 104a, 104b (collectively referred to as, SSM systems 104); client devices 102a, 102b (collectively referred to as client devices 102); and a shared data storage 103 (sometimes referred to as, shared data storage) that are each communicably coupled together via a communication network 120. The shared data storage is configured to store digital certificates associated with client device 102a, digital certificates associated with client device 102, and encrypted secrets.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

An SSM system 104 and a client device 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

An SSM system 104 may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The SSM system 104 may use the same type or different types of virtual environments. For example, one or more key management service (KMS) systems 106 in FIG. 1 and the certificate authority (CA) systems 108 in FIG. 1 may be VMs. In another example, one or more of the KMS systems 106 and the CA systems 108 may be containers. In a further example, the KMS systems 106 and the CA systems 108 may be any combination of VMs, containers, and/or computing devices (or groups of computing devices).

Each of the client devices 102 execute their own client application 112 on their respective processing devices. The SSM system 104a is dedicated (e.g., assigned, allocated) to the client device 102a and the SSM system 104b is dedicated to the client device 102b for securing, storing, and controlling access to digital certificates associated with the client device 102. Each SSM system 104 (sometimes referred to as, vault) includes and/or executes a key management service (KMS) system that is configured to generate a pair of public/private keys for the client device in which it serves, and then share the public key with the client device. Specifically, the SSM system 104 includes a KMS system 106 and the SSM system 104b includes a KMS system 106b.

While the public key of the client device 102 may be publicly available to other computing entities (e.g., any client device 102, any KMS system 106, etc.), the private key of the client device 102 is not. Specifically, the KMS system 106 that is dedicated to a particular client device 102 is configured to generate a private key for the client device 102, and then locally store and/or guard the private key to prevent the client device 102 from accessing its own private key. This ensures that the unsecured client devices 102 are incapable of potentially exposing (e.g., leaking, revealing) their private keys to bad actors. Furthermore, using a plurality of SSM systems 104 (instead of a single SSM system 104) that are each dedicated to a respective client device 102 provides a layer of backup protection within the environment 100. That is, the failure of a client device's 102 SSM system 104 will not interfere with the ability for other client devices 102 with functional (e.g., error-free) SSM systems 104 to securely share secrets with one another.

Each of the SSM systems 104 also include and/or execute a certificate authority (CA) system 108 (sometimes referred to as, a transit endpoint engine) serving as a root CA that owns one or more trusted roots, and is configured to generate and issue digital certificates to its respective client device 102. Specifically, the SSM system 104a includes a CA system 108a and the SSM system 104b includes a CA system 108b. Each of the SSM systems 104 and client devices 102 perform one or more operations of a secret sharing method, the operations of which may be separated into a preparation stage and a procedure stage.

During the preparation stage, each client application 112 generates an unsigned certificate signing request (CSR) that includes the public key that is associated with itself and its own unique set of CSR metadata (e.g., common name (CN) uniquely identifying the client application 112, country identifier, email address, owner identifier, etc.). Each client application 112 sends their unsigned CSRs (shown in FIG.

1 as, unsigned CSR-A and unsigned CSR-B) to their respective SSM system 104 and requests their KMS system 106 to sign the unsigned CSR. The KMS system 106 signs the unsigned CSR using a private key that is associated with the client device 102 of the client application 112 to generate a signed CSR that does not include the private key. The KMS system 106 controls access to the private keys for the client devices 102 to prevent the client devices 102 from accessing and/or locally storing their own private keys, thereby ensuring that the unsecured client devices are incapable of potentially leaking the private keys to bad actors. Each KMS system 106 then sends the signed CSRs (shown in FIG. 1 as, signed CSR-A and signed CSR-B) to its associated CA system. The CA system 108 verifies that the client device 102, as identified by the CN in the signed CSR, is authorized to obtain its own digital certificate and then issues/generates a digital certificate by signing the signed CSR using a private key (e.g., trusted root key) of the CA system 108. The digital certificate includes a time-to-live (TTL) timestamp indicating when the digital certificate becomes valid and when it expires. The CA systems 108 store the digital certificate (shown in FIG. 1 as, digital certificate A and digital certificate B) in a shared storage 103 that is publicly available to the client devices 102 or send the digital certificates to the client devices 102, which in turn, store the digital certificates in the shared data storage 103 themselves.

During the procedure stage, client application 112a executing on client device 102a might want to send a secret (e.g., password, tokens, credentials, etc.) to client application 112b executing on second client device 102b. The client application 112a retrieves the digital certificate (e.g., digital certificate A) that was previously issued to client application 112b from the shared data storage 103. The client application 112a verifies whether the digital certificate was issued to and/or came from client application 112b by, for example, determining whether the digital certificate was signed by CA system 108b (sometimes referred to as, trusted root CA) of the SSM system 104b dedicated to client device 102b, whether the digital certificate is still valid (e.g., not expired), and/or whether the digital certificate contains the client application's 112b CN. The client application 112a encrypts the secret using the client application's 112b public key that is attached to the digital certificate to generate an encrypted secret (sometimes referred to as, encrypted ciphertext).

The client application 112a sends the encrypted secret (shown in FIG. 1 as, encrypted secret A) to the KMS system 106a of its SSM system 104a and requests for the KMS system 106a to sign the encrypted secret. The KMS system 106a signs the encrypted secret using a private key (which is originally held by the KMS system 106a) that is associated with the client device 102a of the client application 112a to generate a signed encrypted secret (shown in FIG. 1 as, signed encrypted secret A). The SSM system 104a stores the signed encrypted secret—which includes the signature and the encrypted secret—in the shared data storage 103 or sends the signed encrypted secret to the client device 102a, which in turn, stores the signed encrypted secret in the shared data storage 103 itself.

The client application 112b retrieves the signed encrypted secret (e.g., encrypted secret A) and the client application's 112a digital certificate from the shared data storage 103. The client application 112b verifies whether the digital certificate was issued to and/or came from the client application 112a by, for example, determining whether the digital certificate was signed by the CA system 108a of the SSM system 104a dedicated to the client device 102a, whether the digital certificate is still valid, and/or whether the digital certificate contains the client application's 112a CN. The client application 112b uses the client application's 112a public key from the digital certificate to verify that the signature on the signed encrypted secret was indeed signed by the client application 112a. The client application 112b then sends the signed encrypted secret to the KMS system 106b of its SSM system 104b and requests for the KMS system 106b to decrypt the signed encrypted secret. The KMS system 106b decrypts the signed encrypted secret using the public key that is associated with the client device 102a of the client application 112a to expose the secret. The KMS system then sends the secret to the client application 112b.

Although FIG. 1 shows only a select number of SSM systems (e.g., SSM systems 104a, 104b), client devices 102 (e.g., client devices 102a, 102b), and data storages (e.g., shared data storage 103); the environment 100 may include any number of these computing devices that are interconnected in any arrangement to facilitate the exchange of data between one another. In some embodiments, an SSM system 104 may include any number of KMS systems 106 and CA systems 108a. Furthermore, although the SSM system 104a is shown to include (or executes) the KMS system 106a and the CA system 108a, the KMS system 106a and the CA system 108a may each execute on different computing devices that are physically (or geographically) separated from one another. Likewise, this variation may also apply to SSM system 104, where the KMS system 106b and the CA system 108b may each execute on different computing devices that are physically (or geographically) separated from one another.

Figure 2B:
FIG. 2B is a block diagram depicting an example of the client device 112 of the environment in FIG. 1, according to some embodiments.
Figure 2A:
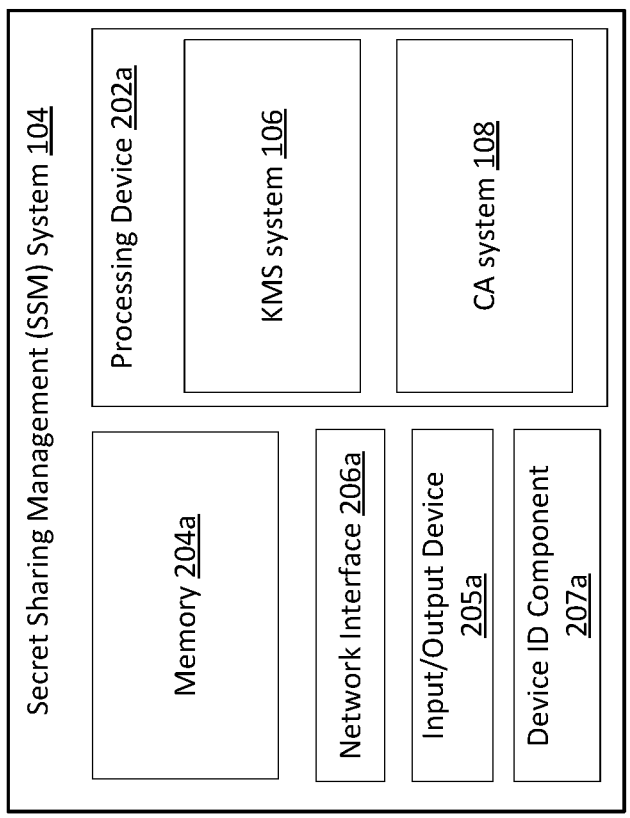
FIG. 2A is a block diagram depicting an example of the secret sharing management (SSM) system 104 in FIG. 1, according to some embodiments.

FIG. 2A is a block diagram depicting an example of the SSM system 104 in FIG. 1 according to some embodiments. While various devices, interfaces, and logic with particular functionality are shown, it should be understood that the SSM system 104 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The SSM system 104 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the SSM system 104. In some embodiments, the processing device 202a and the memory 204a form various processing devices and/or circuits described with respect to the SSM system 104. The instructions include code from any suitable computer programming language such as, but not limited to, C, C++, C#, Java, JavaScript, VBScript, Perl, HTML, XML, Python, TCL, and Basic.

Figure 3:
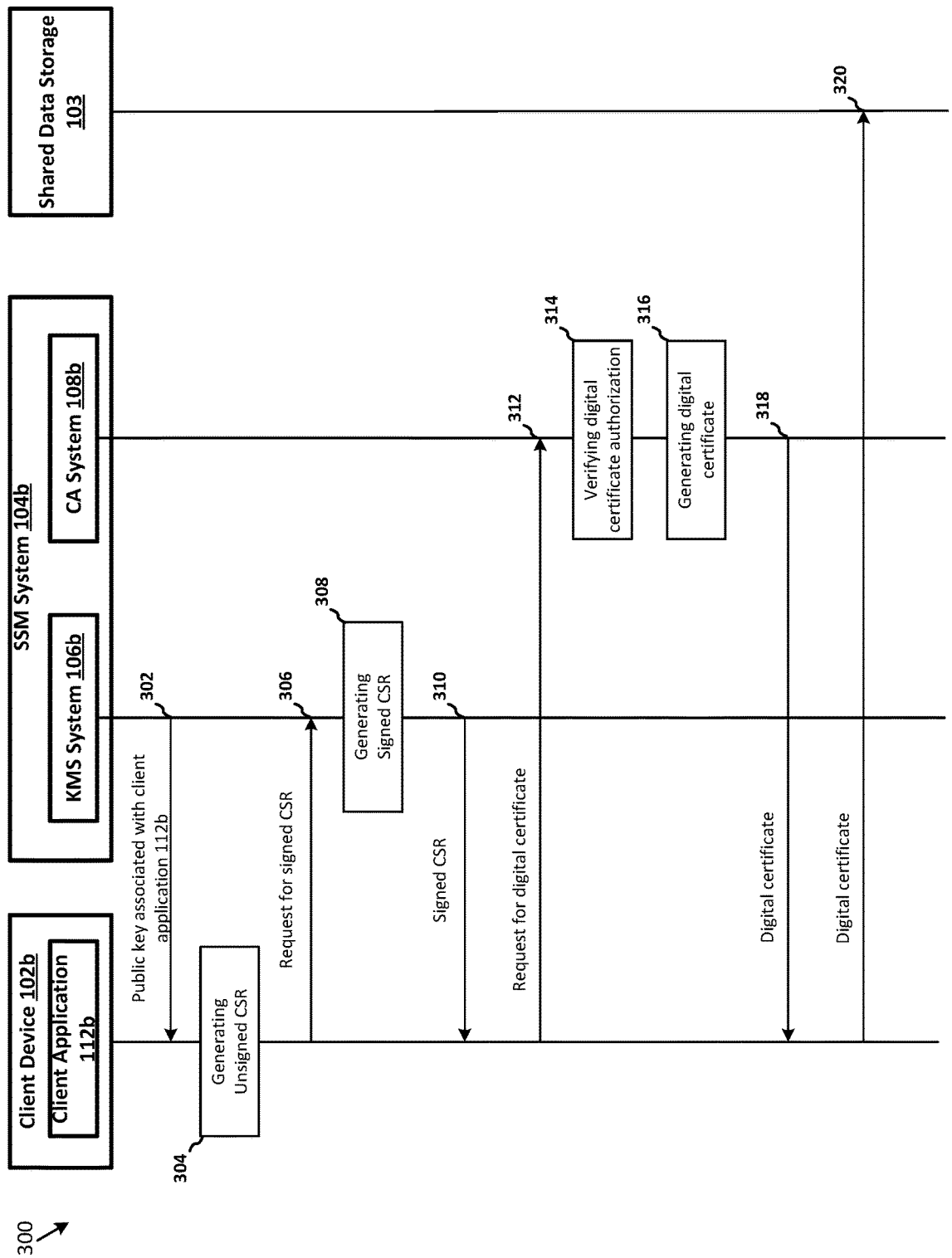
FIG. 3 is a signaling diagram depicting a procedure for generating a digital certificate using public-key cryptography, according to some embodiments.
Figure 4:
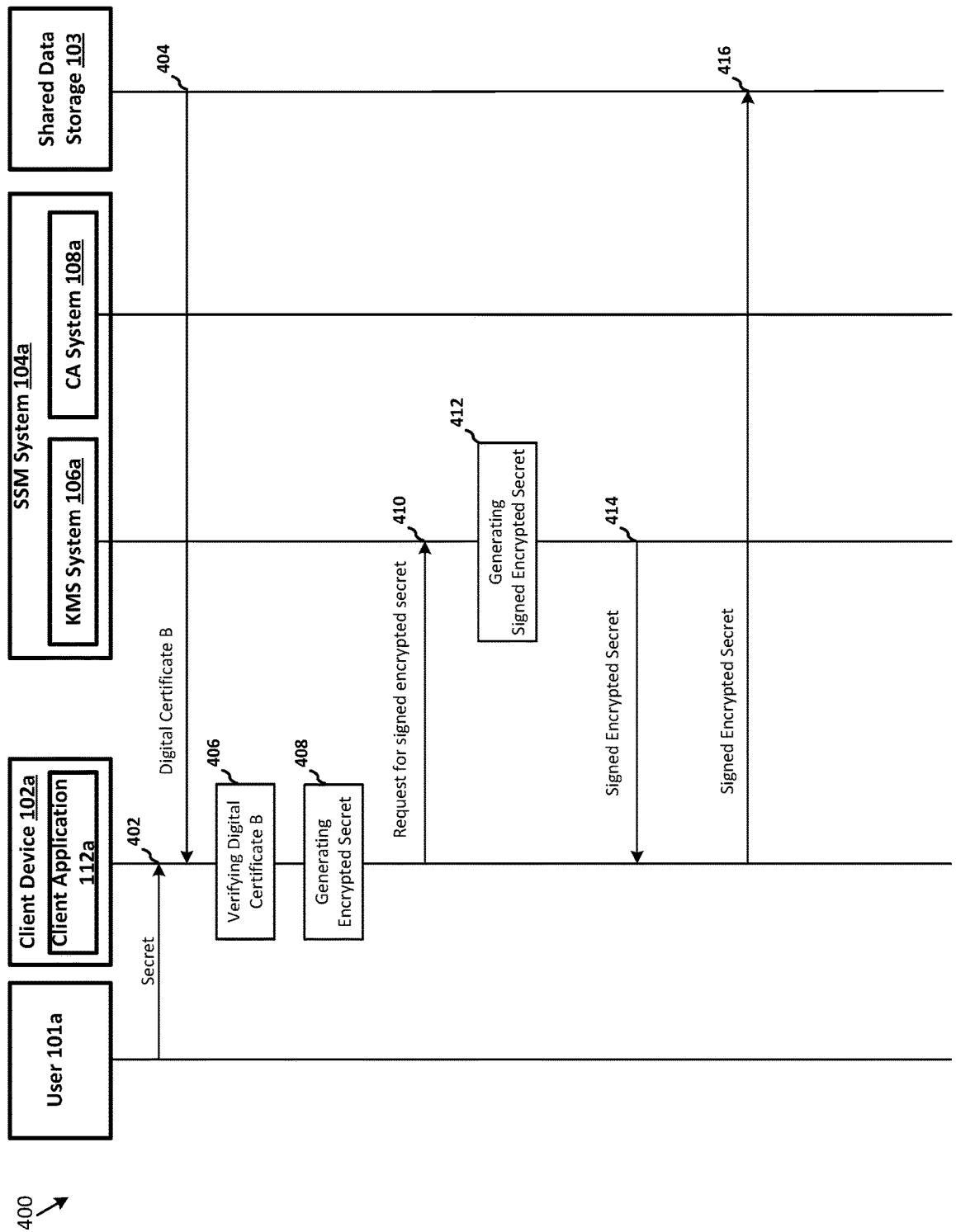
FIG. 4 is a signaling diagram depicting a procedure for encrypting a secret using public key cryptography, according to some embodiments.
Figure 5:
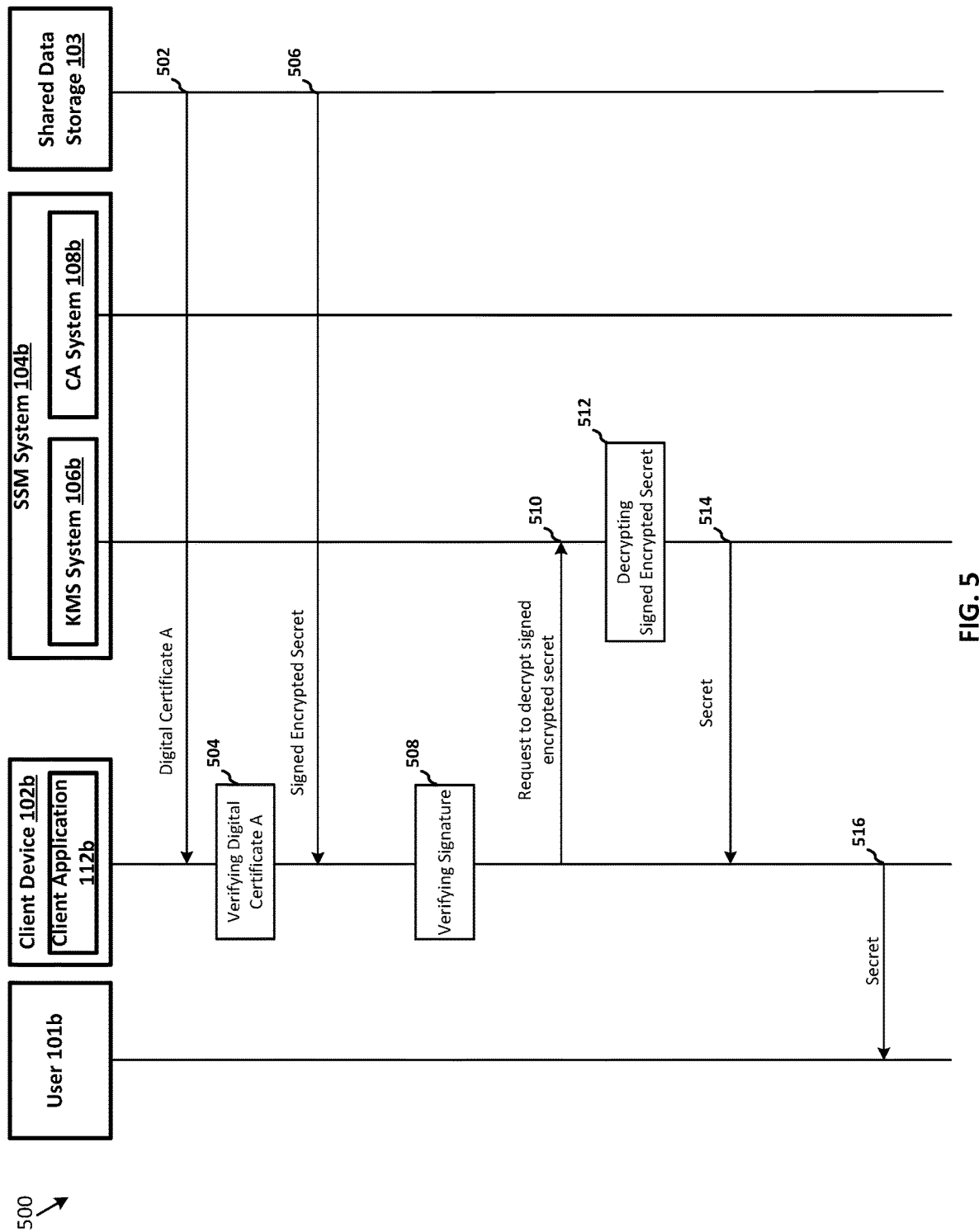
FIG. 5 is a signaling diagram depicting a procedure for decrypting a secret using public key cryptography, according to some embodiments.

The processing device 202a may include and/or execute a key management service (KMS) system 106 and/or CA system 108 that each may be configured to perform one or more of the operations of procedure 300 in FIG. 3, procedure 400 in FIG. 4, and procedure 500 in FIG. 5.

In some embodiments, the SSM system 104 may be configured to receive an unsigned digital certificate signing request (CSR) for a second digital certificate associated with a second application (e.g., client application 112b) executing on a second client device (e.g., client device 102b). In some embodiments, the SSM system 104 may be configured to sign the unsigned CSR using a second private key associated with the second client device to generate a signed CSR. In some embodiments, the second private key is inaccessible to the second client device.

In some embodiments, the SSM system 104 may be configured to generate a second digital certificate associated with the second application (e.g., client application 112b) based on the signed CSR and a different private key associated with the SSM system 104. In some embodiments, the SSM system 104 may be configured to cause the second digital certificate associated with the second application to be stored in the shared data storage 103 available to a first client device (e.g., client device 102a). In some embodiments, the second digital certificate includes a second public key associated with the second client device (e.g., client device 102b).

In some embodiments, the SSM system 104 may be configured to generate the second private key associated with the second client device (e.g., client device 102b). In some embodiments, the SSM system 104 may be configured to generate the second public key associated with the second client device. In some embodiments, the SSM system 104 may be configured to send the second public key to the second client device.

In some embodiments, the SSM system 104 may be configured to receive, from the first client device (e.g., client device 102a), a first request to sign an encrypted secret that was generated based on a second public key associated with the second digital certificate. In some embodiments, the SSM system 104 may be configured to sign the encrypted secret using a first private key associated with the first client device to generate a signed encrypted secret.

In some embodiments, the first private key is inaccessible to the first client device. In some embodiments, the SSM system 104 may be configured to cause the signed encrypted secret to be stored in the shared data storage. In some embodiments, the SSM system 104 may be configured to receive, from the second client device, a second request to decrypt the signed encrypted secret. In some embodiments, the SSM system 104 may be configured to decrypt the signed encrypted secret using the second private key associated with the second client device to expose a secret.

In some embodiments, the secret includes at least one of a password, a token, or an application programming interface (API) key. In some embodiments, to decrypt the signed encrypted secret using the second private key associated with the second client device (e.g., client device 102b) to expose the secret is performed by a different processing device of a different SSM 104.

The SSM system 104 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the SSM system 104 includes a plurality of network interfaces 206a of different types, allowing for connections to a variety of networks, such as local area networks (public or private) or wide area networks including the Internet, via different sub-networks.

The SSM system 104 includes an input/output device 205a configured to receive user input from and provide information to a user. In this regard, the input/output device 205a is structured to exchange data, communications, instructions, etc. with an input/output component of the SSM system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of SSM system 104, such as a built-in display, touch screen, microphone, etc., or external to the housing of SSM system 104, such as a monitor connected to SSM system 104, a speaker connected to SSM system 104, etc., according to various embodiments. In some embodiments, the SSM system 104 includes communication circuitry for facilitating the exchange of data, values, messages, and the like between the input/output device 205a and the components of the SSM system 104. In some embodiments, the input/output device 205a includes machine-readable media for facilitating the exchange of information between the input/output device 205a and the components of the SSM system 104. In still another embodiment, the input/output device 205a includes any combination of hardware components (e.g., a touchscreen), communication circuitry, and machine-readable media.

The SSM system 104 includes a device identification component 207a (shown in FIG. 2A as device ID component 207a) configured to generate and/or manage a device identifier associated with the SSM system 104. The device identifier may include any type and form of identification used to distinguish the SSM system 104 from other computing devices. In some embodiments, to preserve privacy, the device identifier may be cryptographically generated, encrypted, or otherwise obfuscated by any device and/or component of SSM system 104. In some embodiments, the SSM system 104 may include the device identifier in any communication (e.g., remedial action messages, etc.) that the SSM system 104 sends to a computing device.

The SSM system 104 includes a bus (not shown), such as an address/data bus or other communication mechanism for communicating information, which interconnects the devices and/or components of SSM system 104, such as processing device 202a, network interface 206a, input/output device 205a, and device ID component 207a.

In some embodiments, some or all of the devices and/or components of SSM system 104 may be implemented with the processing device 202a. For example, the SSM system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the client device 102 of the environment in FIG. 1, according to some embodiments. While various devices, interfaces, and logic with particular functionality are shown, it should be understood that the client device 102 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The client device 102 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the client device 102 instead of devices and/or components of the SSM system 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the client device 102 instead of devices and/or components of the SSM system 104.

The processing device 202b may include and/or execute a client application 112 (e.g., client application 112a, client application 112b) that is displayed on a computer screen of the client device 102. The client application 112 may be any type of application, such as an operating system, a software driver for hardware (e.g., memory, video, motherboard), an internet/web browser, a graphic user interface (GUI), an email reader/client, a File Transfer Protocol (FTP) client, a virtual machine application, a desk-sharing application (e.g., configured in a server-mode or a client-mode), or a software application that is separate from an internet/web browser. The client application 112 may be a particular brand (e.g., Microsoft, etc.), a particular version of the particular brand (MS Windows 10.2), include a particular service pack (Service Pack 1 for MS Windows 10), and/or rely on a particular database/library version. In some embodiments, the client application 112 may be a container image, which is a standalone and executable package of software that includes everything (e.g., code, runtime, system tools, system libraries and settings) needed to run an application.

The client application 112 may be configured to perform one or more of the operations of procedure 300 in FIG. 3, procedure 400 in FIG. 4, and procedure 500 in FIG. 5.

The client application 112 may be configured to send an unsigned digital certificate signing request (CSR) to the SSM system 104 for a digital certificate. The client application 112 may be configured to receive a digital certificate from the SSM system 104 and store the digital certificate in the shared data storage 103.

The client device 102 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the client device 102 instead of devices and/or components of the SSM system 104.

The client device 102 includes an input/output device 205b configured to receive user input from and provide information to a user. In this regard, the input/output device 205b is structured to exchange data, communications, instructions, etc. with an input/output component of the client device 102. The input/output device 205b includes identical or nearly identical functionality as input/output device 205a in FIG. 2A, but with respect to devices and/or components of the client device 102 instead of devices and/or components of the SSM system 104.

The client device 102 includes a device identification component 207b (shown in FIG. 2B as device ID component 207b) configured to generate and/or manage a device identifier associated with the client device 102. The device ID component 207b includes identical or nearly identical functionality as device ID component 207a in FIG. 2A, but with respect to devices and/or components of the client device 102 instead of devices and/or components of the SSM system 104.

The client device 102 includes a bus (not shown), such as an address/data bus or other communication mechanism for communicating information, which interconnects the devices and/or components of the client device 102, such as processing device 202b, network interface 206b, input/output device 205b, and device ID component 207b.

In some embodiments, some or all of the devices and/or components of client device 102 may be implemented with the processing device 202b. For example, the client device 102 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

FIG. 3 is a signaling diagram depicting a procedure for generating a digital certificate using public-key cryptography, according to some embodiments. The procedure 300 shows the signals and operations of the SSM system 104a, the client application 112a of client device 102a, and the shared data storage 103 in FIG. 1. Although the SSM system 104a is shown to include (or executes) the KMS system 106a and the CA system 108a, the KMS system 106a and the CA system 108a may each execute on different computing devices that are physically (or geographically) separated from one another.

At operation 302, the client application 112b receives the public key that is associated with the client application 112b from the KMS system 106b. The KMS system 106b generated the public key by generating a pair of public and private keys for the client application 112b responsive to receiving a request from the client application 112b.

At operation 304, the client application 112b generates an unsigned certificate signing request (CSR) for a digital certificate associated with the client application 112b. The unsigned CSR includes its own public key and a unique set of CSR metadata. For example, the CSR metadata may include a common name (CN) uniquely identifying the client application 112b, country identifier, an email address, owner identifier, etc.

At operation 306, the client application 112b sends a request to the KMS system 106b for the KMS system 106b to sign the unsigned CSR, where the request includes the unsigned CSR. At operation 308, the KMS system 106b signs the unsigned CSR using the private key that is associated with the client application 112b to generate a signed CSR. The KMS system 106b retrieves the private key from its local storage, which is inaccessible to any of the client devices 102 that can communicate via the communication network 120 in FIG. 1. At operation 310, the KMS system 106b sends the signed CSR to the client application 112b.

At operation 312, the client application 112b sends a request for a digital certificate to the CA system 108b, where the request includes the signed CSR. At operation 314, the CA system 108b verifies that the client device, as identified by the CN in the signed CSR, is authorized to obtain its own digital certificate. At operation 316, the CA system 108b generates a digital certificate by signing the signed CSR using a private key (e.g., trusted root key) of the CA system 108b. In some embodiments, the digital certificate includes a time-to-live (TTL) timestamp indicating when the digital certificate becomes valid and when it expires.

At operation 318, the CA system 108b sends the digital certificate to the client application 112b. At operation 320, the client application 112b stores the digital certificate in the shared data storage 103. In some embodiments, the CA system 108 stores the digital certificate in the shared data storage 103.

Although FIG. 3 shows how the client application 112b of the client device 102b performs operations that result in the storage of a digital certificate associated with the client application 112b into the shared data storage 103. However, in some embodiments, corresponding operations may be performed by the client application 112a of the client device 102a to result in the storage of a digital certificate associated with the client application 112a into the shared data storage 103.

FIG. 4 is a signaling diagram depicting a procedure for encrypting a secret using public key cryptography, according to some embodiments. The procedure 400 shows the signals and operations of a user 101a (not shown in FIG. 1) of client device 102, the client application 112a of client device 102a, the SSM system 104a, and the shared data storage 103 in FIG. 1.

At operation 402, the client application 112a obtains (e.g., receives, retrieves) a secret from the user 101. For example, the user 101 may provide the secret to the client application 112a via a touchscreen interface, a voice command, a keyboard command, and/or a mouse command. In some embodiments, a secret may be any information that is to be kept controlled, such as a password, an application programming interface (API) key, a token, a secure shell (SSH) key, a secret transport layer security (TLS) key, credentials, etc.

At operation 404, the client application 112a retrieves a digital certificate that was previously issued to the client application 112b from the shared data storage 103.

At operation 406, the client application 112a verifies whether the digital certificate was issued to and/or came from the client application 112b. In some embodiments, the client application 112a verifies whether the digital certificate was issued to and/or came from the client application 112b by determining whether the digital certificate was signed by the SSM system 104b, determining whether the digital certificate is still valid (e.g., not expired), and/or determining whether the digital certificate contains the client application's 112b CN.

At operation 408, the client application 112a encrypts the secret using the client application's 112b public key that is attached to the digital certificate (from operation 406) that was issued to the client application 112b to generate an encrypted secret.

At operation 410, the client application 112a sends the encrypted secret to the KMS system 106a of its SSM system 104b and requests for the KMS system 106a to sign the encrypted secret.

At operation 412, the KMS system 106a signs the encrypted secret using a private key (which is originally held by the KMS system) that is associated with the client device 102a to generate a signed encrypted secret.

At operation 414, the KMS system 106a sends the signed encrypted secret—which includes the signature and the encrypted secret—to the client application 112a. At operation 416, the client application 112a stores the digital certificate in the shared data storage 103. In some embodiments, the KMS system 106a stores the signed encrypted secret in the shared data storage 103.

FIG. 5 is a signaling diagram depicting a procedure for decrypting a secret using public key cryptography, according to some embodiments. The procedure 500 shows the signals and operations of a user 101b (not shown in FIG. 1), the SSM system 104b, the client application 112b of client device 102b, and the shared data storage 103 in FIG. 1.

At operation 502, the client application 112b obtains (e.g., receives, retrieves) a digital certificate that was previously issued to the client application 112a from the shared data storage 103. In some embodiments, the digital certificate includes the client application's 112a public key.

At operation 504, the client application 112b verifies whether the digital certificate was issued to and/or came from the client application 112a. In some embodiments, the client application 112b verifies whether the digital certificate was issued to and/or came from the client application 112a by determining whether the digital certificate was signed by CA system 108a of the SSM system 104a based on using the public key associated with the CA system), determining whether the digital certificate is still valid (e.g., not expired), and/or determining whether the digital certificate contains the client application's 112a CN. For example, the client application 112b retrieves the public key associated with the CA system 108a from a public database (e.g., shared data storage 103) and uses the public key associated with the CA system 108a to determine whether the digital certificate was signed by CA system 108a of the SSM system 104a.

At operation 506, the client application 112b obtains (e.g., receives, retrieves) the signed encrypted secret from the shared data storage 103.

At operation 508, the client application 112b uses the client application's 112a public key from the digital certificate to verify that the signature on the signed encrypted secret was indeed signed by the client application 112a. If the client application's 112b determines that the signature is from client application 112a, then the client application 112b determines that the secret of the signed encrypted secret came from client application 112a. If not, then client application 112b determines that the secret of the signed encrypted secret did not come from client application 112a.

At operation 510, the client application 112b sends a request to the KMS system 106b for the KMS system 106b to decrypt the signed encrypted secret responsive to verifying that the signature on the signed encrypted secret was signed by the client application 112a, where the request includes the signed encrypted secret.

At operation 512, the KMS system 106b decrypts the signed encrypted secret using the public key that is associated with the client device 102a of the client application 112a to expose the secret.

At operation 514, the KMS system 106b then sends the secret to the client application 112b. At operation 516, the KMS system 106b displays the secret on a computer screen by sending the secret to the user 101b.

FIG. 6 is a flow diagram depicting a method of encrypting data via public key cryptography with certificate verification of target, according to some embodiments. Method 600 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 600 may be performed by one or more SSM systems, such as SSM systems 104 in FIG. 1. In some embodiments, method 600 may be performed by one or more client device, such as client device 102 in FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

As shown in FIG. 6, the method 600 includes the block 602 of receiving an unsigned digital certificate signing request (CSR) for a second digital certificate associated with a second application executing on a second client device. The method 600 includes the block 604 of signing, by a processing device of a secret sharing management system, the unsigned CSR using a second private key associated with the second client device to generate a signed CSR. In some embodiments, the second private key is inaccessible to the second client device. The method 600 includes the block 606 of generating a second digital certificate associated with the second application based on the signed CSR and a different private key associated with the KMS system. The method 600 includes the block 604 of causing the second digital certificate associated with the second application to be stored in a shared data storage available to a first client device.

Figure 7:
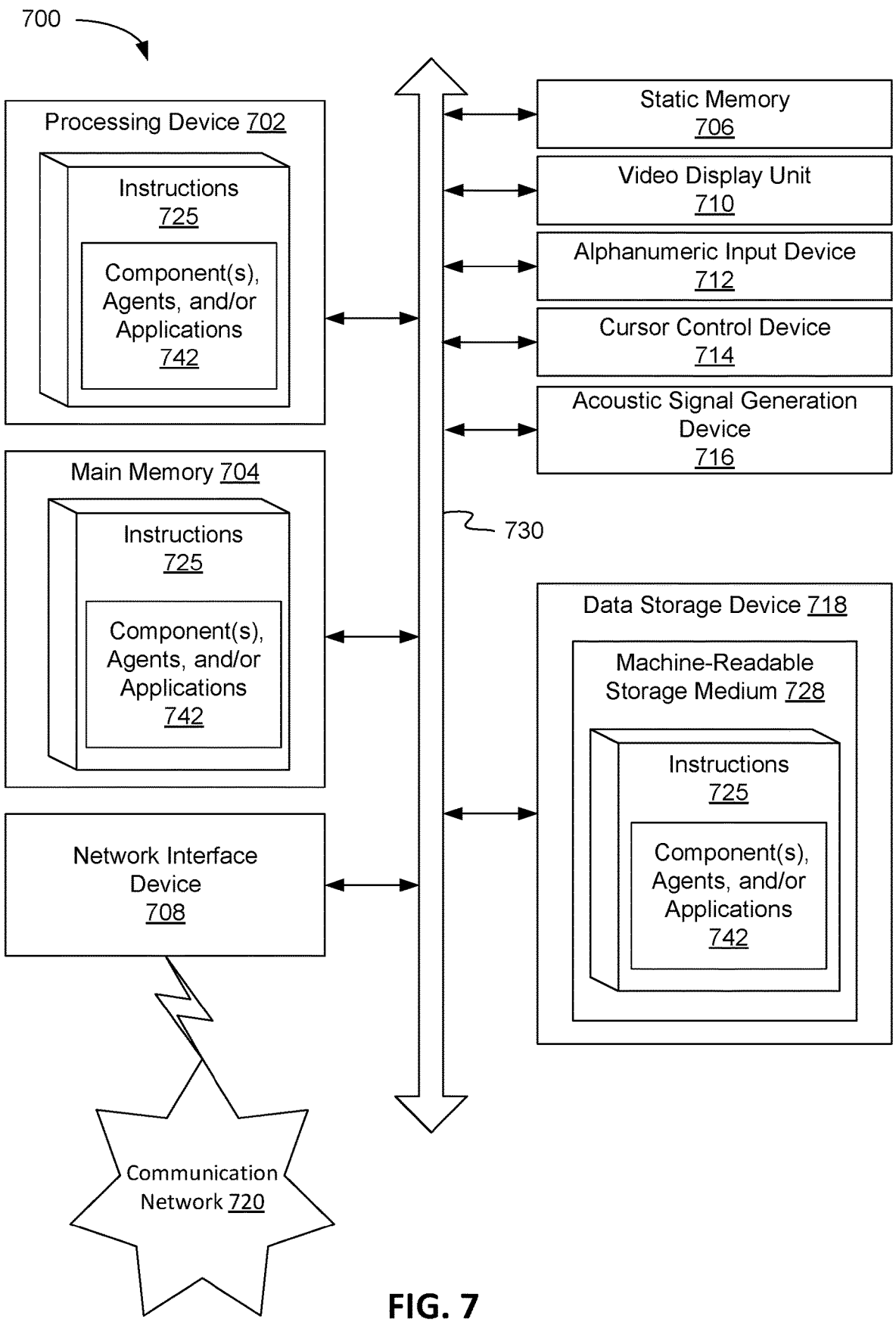
FIG. 7 is a block diagram of an example computing device 700 that may perform one or more of the operations described herein, in accordance with some embodiments.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also include one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a communication network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for one or more components/agents/applications 742 (e.g., KMS systems 106 in FIG. 1, CA systems 108 in FIG. 1, client applications 112 in FIG. 1, etc.) for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a communication network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

EXAMPLES

The following examples pertain to further embodiments:

Example 1 is a method. The method includes receiving an unsigned certificate signing request (CSR) for a second digital certificate associated with a second application executing on a second client device; signing, by a processing device of a secret sharing management (SSM) system, the unsigned CSR using a second private key associated with the second client device to generate a signed CSR, the second private key is inaccessible to the second client device; generating a second digital certificate associated with the second application based on the signed CSR and a different private key associated with the SSM system; and causing the second digital certificate associated with the second application to be stored in a shared data storage available to a first client device.

Example 2 is a method as in Example 1, wherein the second digital certificate includes a second public key associated with the second client device.

Example 3 is a method as in any of Examples 1-2, further including generating the second private key associated with the second client device; generating the second public key associated with the second client device; and sending the second public key to the second client device.

Example 4 is a method as in any of Examples 1-3, further including receiving, from the first client device, a first request to sign an encrypted secret that was generated based on a second public key associated with the second digital certificate; and signing the encrypted secret using a first private key associated with the first client device to generate a signed encrypted secret.

Example 5 is a method as in any of Examples 1-4, wherein the first private key is inaccessible to the first client device.

Example 6 is a method as in any of Examples 1-5, further including causing the signed encrypted secret to be stored in the shared data storage.

Example 7 is a method as in any of Examples 1-6, further including receiving, from the second client device, a second request to decrypt the signed encrypted secret; and decrypting the signed encrypted secret using the second private key associated with the second client device to expose a secret.

Example 8 is a method as in any of Examples 1-7, wherein the decrypting the signed encrypted secret using the second private key associated with the second client device to expose the secret is performed by a different processing device of a different SSM system.

Example 9 is a method as in any of Examples 1-8, wherein the secret includes at least one of a password, a token, or an application programming interface (API) key.

Example 10 is a method as in any of Examples 1-9, wherein the CSR includes at least one of an identifier of the second application, an identifier to an owner of the second application, or an indication of a geographic location associated with the second application.

Example 11 is a method as in any of Examples 1-10, further including providing the second digital certificate to the first client device to cause the first client device to verify that the second digital certificate is associated with the second client device by at least one of determining that the second digital certificate was signed by a certificate authority that is respectively assigned to the second client device; determining that the second digital certificate is unexpired; or determining that the second digital certificate includes an identifier of the second application.

Example 12 is a secret sharing management (SSM) system. The SSM system includes a memory; and a processing device, operatively coupled to the memory, to receive an unsigned certificate signing request (CSR) for a second digital certificate associated with a second application executing on a second client device; sign the unsigned CSR using a second private key associated with the second client device to generate a signed CSR, the second private key is inaccessible to the second client device; generate a second digital certificate associated with the second application based on the signed CSR and a different private key associated with the SSM system; and cause the second digital certificate associated with the second application to be stored in a shared data storage available to a first client device.

Example 13 is an SSM system as in Example 12, wherein the second digital certificate includes a second public key associated with the second client device.

Example 14 is an SSM system as in any of Examples 12-13, wherein the processing device is further to generate the second private key associated with the second client device; generate the second public key associated with the second client device; and send the second public key to the second client device.

Example 15 is an SSM system as in any of Examples 12-14, wherein the processing device is further to receive, from the first client device, a first request to sign an encrypted secret that was generated based on a second public key associated with the second digital certificate; and sign the encrypted secret using a first private key associated with the first client device to generate a signed encrypted secret.

Example 16 is an SSM system as in any of Examples 12-15, wherein the first private key is inaccessible to the first client device.

Example 17 is an SSM system as in any of Examples 12-16, wherein the processing device is further to cause the signed encrypted secret to be stored in the shared data storage.

Example 18 is an SSM system as in any of Examples 12-17, wherein the processing device is further to receive, from the second client device, a second request to decrypt the signed encrypted secret; and decrypt the signed encrypted secret using the second private key associated with the second client device to expose a secret.

Example 19 is an SSM system as in any of Examples 12-18, wherein to decrypt the signed encrypted secret using the second private key associated with the second client device to expose the secret is performed by a different processing device of a different SSM system.

Example 20 is an SSM system as in any of Examples 12-19, wherein the secret includes at least one of a password, a token, or an application programming interface (API) key.

Example 21 is an SSM system as in any of Examples 12-20, wherein the CSR includes at least one of an identifier of the second application, an identifier to an owner of the second application, or an indication of a geographic location associated with the second application.

Example 22 is a non-transitory computer-readable medium storing instructions that, when execute by a processing device of a secret sharing management (SSM)

system, cause the processing device to receive an unsigned certificate signing request (CSR) for a second digital certificate associated with a second application executing on a second client device; sign, by the processing device, the unsigned CSR using a second private key associated with the second client device to generate a signed CSR, the second private key is inaccessible to the second client device; generate a second digital certificate associated with the second application based on the signed CSR and a different private key associated with the SSM system; and cause the second digital certificate associated with the second application to be stored in a shared data storage available to a first client device.

Example 23 is a non-transitory computer-readable medium as in Example 22, wherein the instructions, when executed by a processing device, wherein the second digital certificate includes at least one of a second public key associated with the second client device.

Example 24 is a non-transitory computer-readable medium as in any of Examples 22-23, wherein the instructions, when executed by a processing device, further cause the processing device to generate the second private key associated with the second client device; generate the second public key associated with the second client device; and send the second public key to the second client device.

Example 25 is a non-transitory computer-readable medium as in any of Examples 22-24, wherein the instructions, when executed by a processing device, further cause the processing device to receive, from the first client device, a first request to sign an encrypted secret that was generated based on a second public key associated with the second digital certificate; and sign the encrypted secret using a first private key associated with the first client device to generate a signed encrypted secret.

Example 26 is a non-transitory computer-readable medium as in any of Examples 22-25, wherein the first private key is inaccessible to the first client device.

Example 27 is a non-transitory computer-readable medium as in any of Examples 22-26, wherein the processing device is further to cause the signed encrypted secret to be stored in the shared data storage.

Example 28 is a non-transitory computer-readable medium as in any of Examples 22-27, wherein the processing device is further to receive, from the second client device, a second request to decrypt the signed encrypted secret; and decrypt the signed encrypted secret using the second private key associated with the second client device to expose a secret.

Example 29 is a non-transitory computer-readable medium as in any of Examples 22-28, wherein to decrypt the signed encrypted secret using the second private key associated with the second client device to expose the secret is performed by a different processing device of a different SSM management system.

Example 30 is a non-transitory computer-readable medium as in any of Examples 22-29, wherein the secret includes at least one of a password, a token, or an application programming interface (API) key.

Unless specifically stated otherwise, terms such as "receiving," "signing," "generating," "causing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
   receiving a request for a digital certificate;
   signing, by a processing device, the request using a second private key to generate a signed request;
   generating the digital certificate based on the signed request and a different private key;
   causing the digital certificate to be stored in a shared data storage available to a first client device; and
   signing an encrypted secret using a first private key associated with the first client device to generate a signed encrypted secret, wherein the first private key is inaccessible to the first client device.

2. The method of claim 1, wherein the digital certificate comprises a public key associated with a second client device.

3. The method of claim 2, further comprising:
   generating the second private key associated with the second client device;
   generating a second public key associated with the second client device; and
   sending the second public key to the second client device.

4. The method of claim 1, further comprising:
   receiving, from the first client device, a first request to sign the encrypted secret; and
   signing the encrypted secret using the first private key associated with the first client device responsive receiving the first request to sign the encrypted secret.

5. The method of claim 4, wherein the encrypted secret was generated based on a second public key associated with the digital certificate.

6. The method of claim 4, further comprising:
   causing the signed encrypted secret to be stored in the shared data storage.

7. The method of claim 4, further comprising:
   receiving, from a second client device, a second request to decrypt the signed encrypted secret; and
   decrypting the signed encrypted secret using the second private key associated with the second client device to expose a secret.

8. The method of claim 7, wherein the decrypting the signed encrypted secret using the second private key associated with the second client device to expose the secret is performed by a different processing device of a different SSM system.

9. The method of claim 1, wherein the encrypted secret comprises at least one of a password, a token, or an application programming interface (API) key.

10. The method of claim 1, wherein the request comprises at least one of an identifier of an application executing on a second client device, an identifier to an owner of the application, or an indication of a geographic location associated with the application.

11. The method of claim 1, further comprising:
    providing the digital certificate to the first client device to cause the first client device to verify that the digital certificate is associated with a second client device by at least one of:
    determining that the digital certificate was signed by a certificate authority that is respectively assigned to the second client device;
    determining that a second digital certificate is unexpired; or determining that the second digital certificate comprises an identifier of an application executing on the second client device.

12. A secret sharing management (SSM) system comprising:
    a memory; and
    a processing device, operatively coupled to the memory, to:
    receive a request for a digital certificate;
    sign the request using a second private key to generate a signed request;
    generate the digital certificate based on the signed request and a different private key;
    cause the digital certificate to be stored in a shared data storage available to a first client device; and
    sign an encrypted secret using a first private key associated with the first client device to generate a signed encrypted secret, wherein the first private key is inaccessible to the first client device.

13. The SSM system of claim 12, wherein the digital certificate comprises a public key associated with a second client device.

14. The SSM system of claim 13, wherein the processing device is further to:
    generate a second private key associated with the second client device;
    generate a second public key associated with the second client device; and
    send the second public key to the second client device.

15. The SSM system of claim 12, wherein the processing device is further to:
    receive, from the first client device, a first request to sign the encrypted secret; and
    sign the encrypted secret using the first private key associated with the first client device responsive receiving the first request to sign the encrypted secret.

16. The SSM system of claim 15, wherein the encrypted secret was generated based on a second public key associated with the digital certificate.

17. The SSM system of claim 14, wherein the processing device is further to:
cause the signed encrypted secret to be stored in the shared data storage.

18. The SSM system of claim 14, wherein the processing device is further to:
receive, from the second client device, a second request to decrypt the signed encrypted secret; and
decrypt the signed encrypted secret using the second private key associated with the second client device to expose a secret.

19. The SSM system of claim 18, wherein to decrypt the signed encrypted secret using the second private key associated with the second client device to expose the secret is further performed by a different processing device of a different SSM system.

20. The SSM system of claim 12, wherein the encrypted secret comprises at least one of a password, a token, or an application programming interface (API) key.

21. The SSM system of claim 12, wherein the request comprises at least one of an identifier of an application executing on a second client device, an identifier to an owner of the application, or an indication of a geographic location associated with the application.

22. A non-transitory computer-readable medium storing instructions that, when execute by a processing device of a secret sharing management (SSM) system, cause the processing device to:
receive a request for a digital certificate;
sign, by the processing device, the request using a second private key to generate a signed request;
generate the digital certificate based on the signed request and a different private key;
cause the digital certificate to be stored in a shared data storage available to a first client device; and
sign an encrypted secret using a first private key associated with the first client device to generate a signed encrypted secret, wherein the first private key is inaccessible to the first client device.

23. The non-transitory computer-readable medium of claim 22, wherein the instructions, when executed by the processing device, wherein the digital certificate comprises a public key associated with a second client device.

24. The non-transitory computer-readable medium of claim 23, wherein the instructions, when executed by the processing device, further cause the processing device to:
generate a second private key associated with the second client device;
generate a second public key associated with the second client device; and
send the second public key to the second client device.

25. The non-transitory computer-readable medium of claim 22, wherein the instructions, when executed by the processing device, further cause the processing device to:
receive, from the first client device, a first request to sign the encrypted secret; and
sign the encrypted secret using the first private key associated with the first client device responsive receiving the first request to sign the encrypted secret.

26. The non-transitory computer-readable medium of claim 25, wherein the encrypted secret was generated based on a second public key associated with the digital certificate.

27. The non-transitory computer-readable medium of claim 25, wherein the processing device is further to:
cause the signed encrypted secret to be stored in the shared data storage.

28. The non-transitory computer-readable medium of claim 25, wherein the processing device is further to:
receive, from a second client device, a second request to decrypt the signed encrypted secret; and
decrypt the signed encrypted secret using a second private key associated with the second client device to expose a secret.

29. The non-transitory computer-readable medium of claim 28, wherein to decrypt the signed encrypted secret using the second private key associated with the second client device to expose the secret is performed by a different processing device of a different SSM management system.

30. The non-transitory computer-readable medium of claim 22, wherein the encrypted secret comprises at least one of a password, a token, or an application programming interface (API) key.

* * * * *